Figure 3:
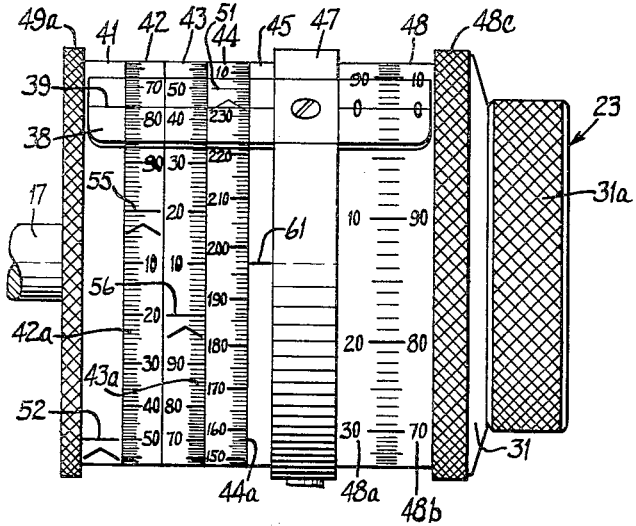

Aug. 21, 1962     G. G. F. SMEETS     3,049,807
CALIBRATED POSITIONING DEVICE
Filed Aug. 25, 1958     2 Sheets-Sheet 1
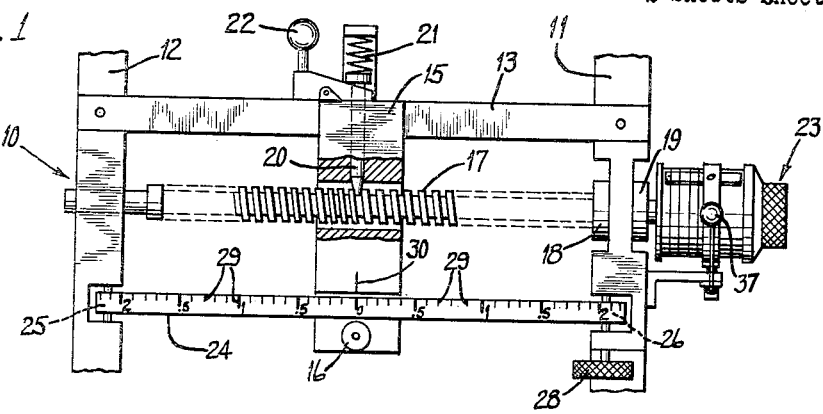
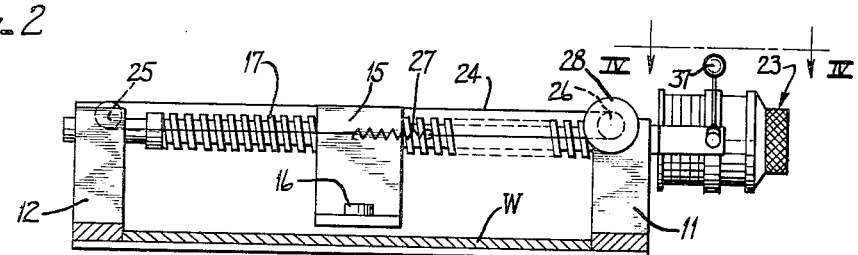
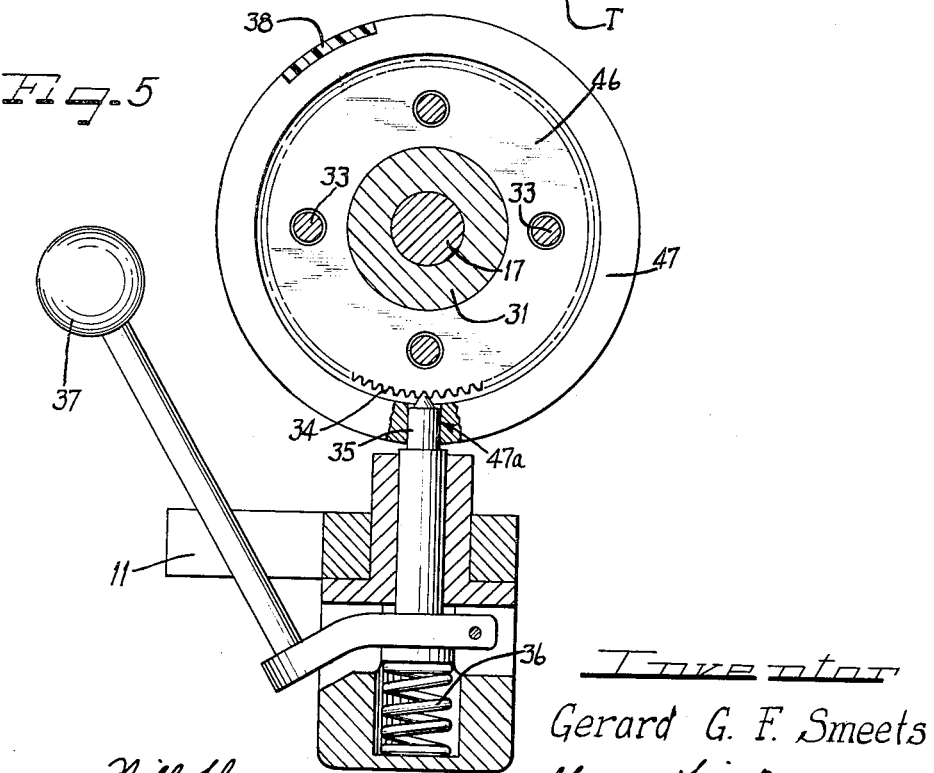
Inventor
Gerard G. F. Smeets
by Hill, Sherman, Meroni, Gross & Simpson
Attys Aug. 21, 1962 — G. G. F. SMEETS — 3,049,807
CALIBRATED POSITIONING DEVICE
Filed Aug. 25, 1958 — 2 Sheets-Sheet 2

Inventor
Gerard G. F. Smeets
by Hill Sherman Meroni Gross & Simpson
Attys

United States Patent Office 3,049,807
Patented Aug. 21, 1962

3,049,807
CALIBRATED POSITIONING DEVICE
Gerard Gaston Frans Smeets, Brampton, Ontario, Canada, assignors to Houdaille Industries, Inc., Buffalo, N.Y., a corporation of Michigan
Filed Aug. 25, 1958, Ser. No. 756,975
5 Claims. (Cl. 33—189)

This invention relates generally to a calibrated positioning device, and more specifically to an improved structure for adjustment of a machine tool with respect to a reference point.

Although the principles of the present invention may be included in various positioning devices, a particularly useful appliction is made in a machine for locating points on a sheet which is subsequently given a right angle bend and wherein inside and outside locating dimensions are provided which are related to the bend.

My invention finds particular application in a layout marking or drilling machine wherein marking or drilling must be made in accordance with measurements given on a drawing. As will become apparent from the material which follows, the instant invention may be adapted to be used with either decimal or fractional dimensions, or with a combination thereof.

With the apparatus available at present, it is necessary for an operator to add and subtract the various dimensions. This is a time consuming practice and is a source of errors and rejects in the final product. By way of example, in the instance of a chassis layout for an electronic amplifier, a typical drawing for such a layout gives dimensions from the edge of the chassis to centers of holes or other points. The chassis is normally box-shaped, and it is desirable that holes be marked and drilled on a flat piece of material prior to the bending down or forming of the sides, so as to provide ease of manufacture. In order to effect the layout work, an allowance in dimensions must be made for the depth of the edges, the thickness of the material, as well as the bend allowance and radius of the subsequent bend. This increases the complexity of the measurement calculation, and frequently gives rise to further error. A substantial amount of time can be spent calculating the necessary dimensions, and this gives rise to an undue increase in the cost of manufacture.

It is therefore an object of my invention to provide a machine tool adjusting and indicating device which allows various adjustments to be made thereon.

It is a further object of my invention to provide a displacement indicating device which is easily used and understood.

It is a still further object of my invention to provide a tool adjustment indicator having zeroing means so that any desired reference point may be arbitrarily selected and further settings will be shown with respect to the selected reference point.

Yet another object of my invention is to provide an adjusting and indicating device which is simple in construction and economical to manufacture.

Another object of my invention is to provide a positioning device which permits rapid traverse of the tool carrier, and at the same time allows for accurate final adjustment.

A further object of my invention is to provide a positioning device which will provide direct readings as to the displacement of a member in either direction from a selected zero or reference point.

Many other advantages, features and additional objects of the present invention will become manifest to those versed in the art upon making reference to the detailed description and the accompanying sheets of drawings in which a preferred structural embodiment incorporating the principles of the present invention is shown by way of illustrative example.

Figure 4:
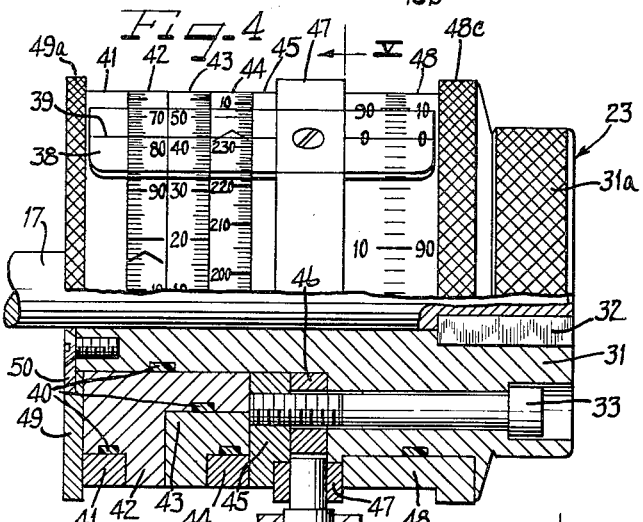
Figure 6:
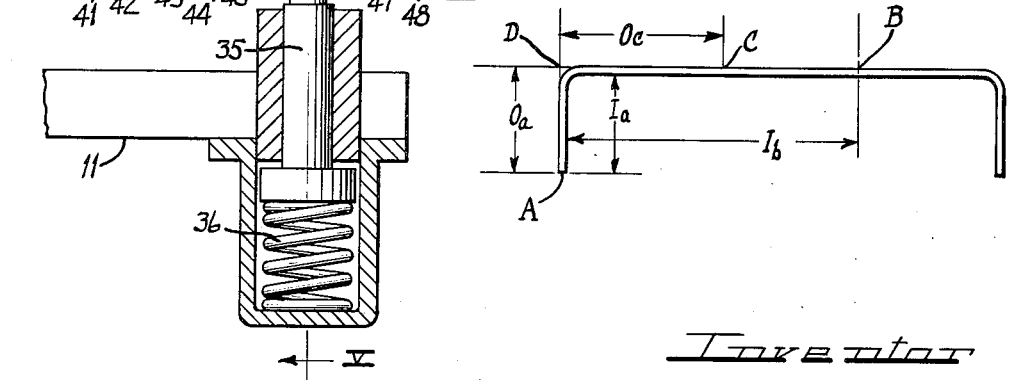

On the drawings:
FIGURE 1 is a plan view of a positioning device provided in accordance with the principles of the present invention;
FIGURE 2 is a front elevation of the device shown in FIGURE 1;
FIGURE 3 is an enlarged view of a portion of FIGURE 1;
FIGURE 4 is generally similar to FIGURE 3, but is partially broken away to show internal details;
FIGURE 5 is a view taken along line V—V of FIGURE 4; and
FIGURE 6 illustrates a layout problem pertaining to the application of the invention.

As shown on the drawings:
The principles of this invention are particularly useful when embodied in a positioning device such as illustrated in FIGURE 1, generally indicated by the numeral 10.

Referring to FIGURES 1 and 2, the machine tool positioning device 10 is shown as comprising two main frame or supporting members 11, 12, with a cross-member 13 secured at its ends to the frame members 11 and 12. The supporting members 11, 12 and the cross-members 13 are jointly referred to herein as a frame.

A tool carrier member 15 is slidably supported by the cross-member 13 of the frame, and in turn supports a means generally indicated at 16 for positioning a tool with respect to the workpiece.

A lead screw 17 is rotatably journalled at its ends in each of the supporting members 11 and 12 and has threaded engagement with the carrier 15, whereby upon rotation of the lead screw 17, relative motion is effected between the carrier member 15 and the frame members. The workpiece is so arranged with respect to the device 10 that the motion of the carrier 15 will be at right angles to the prospective bend line. The lead screw 17 is provided with means for preventing axial movement of the lead screw with respect to the member in which it is journalled, such means here comprising a pair of spaced flanges 18, 19.

The carrier member 15 is provided with a reciprocable pin 20 which is biased against the threads of the screw 17, such as by a spring 21 so that the pin 20 is snugly disposed intermediate a pair of adjacent threads. A hand lever 22 is pivoted to the carrier 15 and is arranged to act on the pin 20 for selectably retracting the pin 20 against the force of the spring 21 so as to permit the pin 20 to clear the threads of the screw 17. Thus when the lever 22 is deflected, the carried 15 may be rapidly moved along the length of the cross-member 13 and the lead screw 17 to a desired position. Upon release of the lever 22, the pins 20 becomes engaged intermediate a pair of threads. Of course, if the pin 20 were not retractable, the carrier 15 would be translataable to the same point by rotation of the lead screw 17.

As best seen in FIGURE 2, the frame members 11, 12 may be supported on a table T, as is a workpiece W so that a drill bit or marker may be guided by the means 16 on the carrier 15 to contact the workpiece W.

Secured to the one end of the lead screw 17 is a knob assembly 23 which may be readily rotated to effect translation of the carrier member 15.

A calibrated scale or tape device 24 extends across between the upper side of the frame members 11, 12 and over a pair of rollers 25, 26 and the free ends are tied together by means of a spring 27 as shown in FIGURE 2. A knurled wheel 28 is provided to allow for adjustment or positioning of the tape or belt 24 over the rollers 25, 26.

The belt 24 is provided with a series of spaced reference means 29 which comprise indicia. Preferably, the indicia 29 include reference numerals which indicate distances from an origin or zero-point on the scale 24. It is further preferable that the pitch of the lead screw 17, or number of threads provided per unit length be such that there is one thread for each one of the calibration indicia. Thus one revolution of the lead screw 17 will advance the carrier 15 exactly the amount indicated by the space between a pair of adjacent indicia on the calibrated scale 24.

The carrier 15 is provided with means which registers with the scale 24 and which is movable with the carrier 15 for indicating the relative displacement between the carrier 15 and frame members 11—13. In this embodiment, such means comprises an index mark 30. Thus the mark 30 together with the scale 24 provide a coarse or general indication of the relative displacement. It is obvious that this distance may be expressed as decimal parts of a unit of length, or as fractional parts thereof having a denominator other than ten.

After the guide means 16 has been aligned with an edge or other base line of the workpiece W, the wheel or knob 28 may be rotated so that the scale 24 is thereby also rotated. The knob 28 is moved until a portion of the scale 24, adjacent to the index 30 and movable in parallel relation to both the lead screw 17 and the movement of the carrier 15, has been adjusted to a zero position, thereby establishing a reference point on the device 10. It is thus apparent that the scale 24 is supported by and secured to the frame and is provided with means which permits moving at least a portion of this scale parallel to the index mark 30.

It should be noted that the carrier 15, when decoupled from the lead screw 17, may be freely moved to the left or right and may be allowed to reengage the lead screw 17. If precautions are taken to maintain the same position of the scale 24 during such movement, a predetermined number of equal units of displacement can be rapidly and accurately obtained. Allowance, of course, has to be made for the change of readings if the carrier 15 is displaced in either direction past the zero point of scale 24. Thus the reading to the left of the zero point must be added to the reading to the right of the zero point where the zero point is not shifted.

The knob assembly 23, having a vernier-type of mechanism for accurately rotating the lead screw 17 a proper angular extent, will now be described, with particular reference to FIGURES 3–5 of the drawings. The angularly calibrated means or knob assembly 23 includes a main knob portion or body 31 which is provided with a driving connection with the lead screw 17 whereby the knob body 31 and the screw 17 are corotatable. To this end, a key 32 prevents relative rotation by being disposed to intersect the common surface between the knob body 31 and the screw 17. As best seen in FIGURE 4, the knob assembly 23 includes a plurality of annular collars or rings 41–49 which encircle the body or main knob portion 31, and of which collars, the collars numbered 41–44, and 48 are individually manually rotatable with respect to the body 31 of the knob assembly 23. The collars 42, 43 and 48 are each provided with a series of angularly spaced indicia 42a, 43a, 48a, and 48b. The various individual indicia in the various series are spaced apart angularly by an amount which corresponds to the angular rotation which must be imparted to the screw 17 to effect the relative translation between the carrier 15 and the frame members 11—13 indicated by the indicia. Thus the various collars or rings 41–44 and 48 may be individually rotated with respect to the remainder of the knob assembly 23 so that the calibration or calibrated scale thereof may be zeroed or suitably moved to a reference.

The instant embodiment discloses angularly spaced indicia spaced 3.6 degrees apart whereby one revolution is divided into 100 equal angular increments.

In this embodiment, the collars 45 and 46 are corotatably secured to the knob body 31 as by a screw 33. The collar 46 is provided with a plurality of circularly arranged teeth 34, uniformly spaced apart, and adjacent to the inner periphery of the collar 47, being radially directed toward the collar 47 in this embodiment.

The collar 47 is relatively rotatable with respect to the collar 46, but is held in a manner to preclude movement between the collar 47 and the frame member 11. To this end, there is provided a pin 35 which is reciprocably carried and guided by a portion of the frame member 11, and which is biased by a spring 36 to positively engage the series of teeth 34. A hand release lever 37 is pivoted to the frame member 11 and is arranged to engage the pin 35 so as to retract it away from the teeth 34 in opposition to the force from the compression spring 36. The collar 47 has an aperture 47a within which the pin 35 is also slidable. Thus the collar 47 cannot rotate at any time. It can now be seen that means have been provided which are carried by the frame and which engage one of the collars 47 to preclude rotation of such collar, such means being releasably engageable with the teeth on the knob body 31 to lock the angular position of the knob body 31 and the screw 17 in a precise preselected position. Preferably, the number of teeth 34 is exactly equal to the number of indices carried on the collar 48 whereby the screw 17 may be positively and readily locked at precise points corresponding in number to the angular graduations on the knob.

The ring 47 is further provided with a reference means which cooperates with the indicia on the various collars in effecting the fine readings which can be made. The reference means includes a finger 38, such as of transparent plastic on which there is provided an index mark 39 with respect to which the various collars may be zeroed. It will be noted that the finger 38 extends parallel to the axis of the knob and overlies closely the various collars. Thus also the index mark 39 is always stationary with respect to the frame member 11.

The knob body 31 may be provided at its handle portion with knurling as at 31a, while the ring 48 may likewise be provided with knurling as at 48c. The indicia 48a and 48b represent scales ascending in opposite angular directions so that the scale may be directly read with either direction of knob rotation.

The collar 49 is secured to the collar 42, and has knurling on its outer periphery as at 49a. Thus the collars 49 and 42 are jointly rotatable about the knob body 31. The collar 41 is actually carried by the collar 42 as is also the collar 43 which in turn carries the collar 44. Thus rotation of the collar 49 rotates each of the collars 41–44. However, the collar 41 may be rotated separately with respect to the collar 42, as may also the collar 43. Further, the collar 44 may be moved independently of the collar 43. A clamp ring 50 is secured to the knob body 31 in a manner so as to hold the various rings 41–44, and 49 securely but movably in place. Thus rotation of one of the collars 41–44 can be made relative to any one or all of the remaining collars. Friction means 40 may be provided for various collars to prevent accidental movement of one collar with respect to another.

As best seen in FIGURE 3, the collar member 41 is provided with an index marker 52 as shown. The collar member 42 is provided with the series of indicia 42a, while the collar member 43 is provided with the series of indicia 43a, similar to the indicia 42a but having an opposite direction of increasing magnitude. The collar member 44 has an index marker 51, and similar markings 55 and 56 are provided at the zero-point of the collars 42 and 43. This particular scale arrangement is especially adapted for application to chassis layout work wherein the bend allowance of metals must be taken into account.

The index marker 52 of the collar member 41 is designated as being related to an outside dimension such as $O_a$ of FIGURE 6. The index marker 55 of the collar 42 is located at the zero-point of the scale 42a and is indicated as being related to an inside dimension such as $I_a$ of FIGURE 6. The index marker 56 is located at the zero-point of the scale 43a of the collar 43 and is indicated as relating to an inside dimension such as $I_b$. The index marker 51 of the collar 44 relates to an outside dimension such as $O_c$ of FIGURE 6.

The use of the device in conjunction with chassis layout can best be explained with reference to FIGURE 6 wherein it is desired to drill or otherwise form holes at each of a pair of points B and C in a metal chassis having a depth of sides $I_a$ inches. The point B is located $I_b$ inches from the left hand edge of the chassis and the point C is located $O_c$ inches from the same side. $I_a$ and $I_b$ are inside dimensions and $O_c$ is an outside dimension. It is desired to locate the holes B and C before the chassis is formed, i.e. before the sides are bent.

Referring to FIGURE 6, it is known that the distance from A to B on the unformed sheet is:

$$A \text{ to } B = I_a + I_b - 0.43R + BA \quad (1)$$

wherein R is the radius of the bend and BA is the bend allowance for the type of metal used in the chassis having a thickness T. In this example, BA is to be considered 20/1000 in. and T to be 50/1000 in. and the radius of the bend to be zero.

The collars 41-44 are now set up as shown in FIGURE 3 in the following manner. The collar 41 is rotated so that the index marker 52 thereof is aligned with the graduation 50 of the indices 42a, thereby indicating a thickness of 50/1000 in between the index markers 52 and 55. The collar 44 is rotated relative to the collar 43 so that the index marker of the collar 44 is aligned with the indicium 50 of the graduations 43a to indicate a distance or thickness of 50/1000 in. between the index markers 51 and 56. Finally the collars 43 and 44 are rotated as a unit with respect to the collar 42 until the index markers or zero points 55 and 56 are displaced from each other by a reading of 20/1000 inch, namely the bend allowance. It is to be noted that this value may be read on either the collar 42 or the collar 43.

Now to drill hole B at the proper point, the drill is first positioned at point A and the main scale or tape 24 is set to read zero by means of the knurled knob 28. The collar 48 is also rotated by grasping the knurled portion 48c so that the zero of its scale is aligned with the reference line 39. The release lever 37 is now moved in a releasing direction and the knob body 31 is rotated until the reading $I_a$ in. registers jointly on the scale 24 and the collar 48. The knob body 31 is now locked by release of the lever 37 and the collar 48 and scale 24 are reset to zero. The release lever 37 is again released and the knob body 31 is again rotated in the same direction to indicate the distance $I_b$ jointly on the scale 24 and the collar 48, at which time the lever 37 is again released to permit locking of the lead screw. It is apparent that when the knob body 31 is rotated, the collars 41, 42, 43, 44, and 48 are also rotated thereby and therewith.

To further correct the drill position for the bend allowance, the collars 41-44 are rotated as a unit in the same direction by means of the knurled ring 49 until the first of the index markers 55 and 56 registers with the reference means 39, which relates to the inside dimension $I_a$. The manual lever 37 is now released and knob body 31 is rotated in the same direction as before until the second of the index markers 55 and 56 registers with the reference means 39. In this example, such rotation advances the carrier by the distance indicated between the markers 55 and 56, namely 20/1000 inch, which is the bend allowance. The drill bit is now at the proper point for drilling of the hole B.

In order to locate hole C, the scale 24 and the collar 48 are brought to their respective zero positions with the screw 17 locked. The knob body 31 may now be rotated in the opposite direction until the distance $I_b$ is indicated on the collar 48 and the scale 24. It is apparent that the point D must be located in order to read the measurement $O_c$ directly. To accomplish this, the knurled ring 49 is rotated so that all of the collars 41-44 rotate beneath the reference line 39. The ring 49 is rotated in the same direction as the knob body 31 was last turned until the first of the reference markers 51 and 56 registers with the reference line 39. Then the handle 37 is actuated and the knob body 31 is rotated in the same direction until the second of the markers 51 and 56 registers with the reference line 39. It can be seen that this effects the movement of the carrier 15 by an amount equal to the thickness T of the material. At this point, the handle or lever 37 is released so that the lead screw 17 again becomes locked and then the scale 24 and collar 48 are again aligned at zero position. The handle 37 may again be released so that the knob 31 may now be rotated in the opposite direction for the distance $O_c$.

Alternately, the hole C can be located by first resetting the carrier 15 to the point A and zeroing the scale 24 and the collar 48. The equation for the location of the point C by this method is as follows:

$$A \text{ to } C = I_a + O_c - T + BA = I_a + O_c - (T - BA) \quad (2)$$

With the lever 37 released, the knob body 31 is rotated until the measurement $I_a$ is indicated jointly on the scale 24 and the collar 48, and then the screw 17 is locked in position. By grasping the collar ring 49, the collars 41-44 are rotated as a unit in the opposite direction until the first of the index markers 55 and 51 registers with the reference line or mark 39. Then the knob body 31 is rotated with the handle 37 released until the other of the markers 55 and 51 registers with the reference line 39, the rotation being in the same direction as that applied to the ring 49 and opposite to that last applied to the knob body 31. Since the index markers 56 and 51 are set to give a displacement of T (namely 50/1000 in. of carrier movement in response to rotation of the knob body 31 in the arc encompassed between them), and rotation of the knob body 31 through the arc encompassed between the index points 56 and 55 causes a displacement of BA, namely 20/1000 in., then movement as described above causes a displacement of $T - BA$ inches at the carrier 15 which is the subtraction required by Equation 2. The lead screw 17 may now be locked and the scale 24 and the collar 48 rotated to zero so that the dimension $O_c$ may subsequently be cranked-in in an additive direction, the hole C thus being accurately located.

Where the outside dimensions $O_a$ and $O_c$ are given for the location of the point C, the following equation applies:

$$A \text{ to } C = O_a + O_c - 2T + BA = O_a + O_c - (2T - BA) \quad (3)$$

This locating may be readily accomplished by setting the carrier 15 at the point A, zeroing the main indicator 24, 48, and cranking up the dimensions $O_a$ and $O_c$. The lead screw 17 may now be locked and the ring 49 rotated in the opposite direction until the first of the index markers 51 and 52 registers with the reference line 39. The lever 37 may then be released and the knob body 31 rotated in the same direction until the other of the reference markers 51 and 52 registers with the reference line 39. This movement of the knob body 31 causes the carrier 15 to reverse its direction of movement by an amount $T + T - BA$ which is in effect subtracting the amount $(2T - BA)$ as is required.

Thus it can be seen that once the collar members 41-44 inclusive are set up correctly, an operator can readily locate holes when cognizance is taken of whether outside or inside dimensions are given and the knob body 31 set up and rotated in relation to the reference line 39 to indicate correctly whether a dimension is taken inside or outside and its relation to the edge bend point.

This invention has further utility. It is apparent that other adjustments, such as for tolerances, may be readily inserted into the solution. For example, half of a decimal tolerance can easily be added or subtracted to a setting, depending on whether the tolerance is positive or negative.

Other combinations of collars and scales may be utilized to advantage. For example, the instant collar 44 may be provided with a scale calibrated to correspond to radii of bends by providing for an axial displacement of the carrier 15 by 0.43 times the radius indicated. In such a case, a scale 44a may be incorporated on the collar 44 as shown. The index points or markers can be so arranged that when the radius of bend dimension calibration is set opposite the proper calibration for the bend allowance on the scale 42a, and the index marker 51, now located at the zero point of the scale 43a, is displaced from the index marker 56 in a direction by the calibration relating to the thickness T, then the use of the device is now incidental to that described and the radius of bend is automatically taken account of. The operator needs only to refer to the index marker related to the dimension he is intending to crank up.

As best seen in FIGURES 3 and 4, the collar 45 is provided with an index 61 on its outer surface. Since the collar 45 is drivably connected to the knob body 31 and the lead screw 17, this index mark will rotate whenever the knob body 31 is rotated. When work is to be done wherein no positive reference line is provided on the workpiece, e.g. an arbitrary base line disposed remotely from edges of the workpiece, the registration of the index mark 61 with the reference line 39 may be utilized as a base line for the foregoing types of usages.

It is apparent that various combinations of measurements and that various units of measurement may be indicated on the scale 24 and the various collars, including the number of teeth on the collar 46.

It is also apparent that two or more of the instant devices may be combined to facilitate complete and accurate adjustment of a tool in a plane or in three dimensions, respectively. Further, the instant invention may be adapted to a power brake for the right angle bending of sheet material wherein radius of bend and bend allowance must be taken care of, and may also be adapted into suitable micrometer type of instruments.

Although various minor modifications might be suggested by those versed in the art, it should be understood that I wish to embody within the scope of the patent warranted hereon all such embodiments as reasonably and properly come within the scope of my contribution to the art.

I claim as my invention:

1. In a positioning device adapted to displace a first member with respect to a second member, and having a lead screw member adapted on rotation thereof to effect movement of the first member with respect to the second member, the improvement of means adapted to angularly rotate the lead screw a predetermined amount, said means comprising: a knob body corotatably secured to the lead screw for rotation thereof; a first collar fitted for rotation about said knob body; at least one series of angularly spaced indicia defining a calibrated scale related to the relative displacement between said members and located on said collar; a series of circularly arranged teeth disposed in uniformly spaced relation on said knob body; a second collar fitted about said knob body adjacent to said teeth for relative rotation with respect to said knob body; means carried by the second member and engaging said second collar in a manner so as to preclude rotation thereof when said knob body is rotated, said means being releasably engageable with said teeth to lock the angular position of said knob body and said lead screw; and reference means secured to said second collar and adapted to cooperate with said indicia for indicating relative displacement between the members.

2. In a positioning device adapted to displace a first member with respect to a second member, and having a lead screw member adapted on rotation thereof to effect movement of the first member with respect to the second member, the improvement of means adapted to angularly rotate the lead screw a predetermined amount, said means comprising: a knob body corotatably secured to the lead screw for rotation thereof; a first collar fitted for rotation about said knob body; at least one series of angularly spaced indicia defining a calibrated scale related to the relative displacement between said members and located on said collar; a series of radially directed teeth disposed in uniformly spaced relation on said knob body; a second collar fitted about said teeth for relative rotation with respect to said knob body; a pin carried by the second member and engaging said second collar in a manner so as to preclude rotation thereof when said knob body is rotated, said pin being releasably biased into radial engagement with said teeth to releasably lock the angular position of said knob body and said lead screw; and reference means secured to said second collar and adapted to cooperate with said indicia for indicating relative displacement between the members.

3. In a machine for locating points on a sheet which is subsequently to be given a right angle bend and wherein inside and outside locating dimensions which are related to the bend are provided:
   (a) a first member;
   (b) a second member slidably supporting said first member for motion at right angles to the line of the subsequent bend;
   (c) a lead screw rotatably secured to said second member in an axially fixed position and effective on rotation to displace said first member with respect to said second member;
   (d) a scale secured to said second member in parallel relation to said lead screw, said scale having a series of spaced indicia thereon;
   (e) index means on said first member registerable with said indicia on said scale for indicating the displacement of said first member with respect to said scale;
   (f) first calibrated means connected to said axially fixed lead screw for angularly rotating said lead screw with respect to said second member; and
   (g) three additional calibrated means, supported by said first calibrated means in an axially fixed position and operative by angular movement with respect to said first calibrated means to compensate respectively for the thickness, the radius of said bend and the bend allowance for the sheet.

4. In a positioning device:
   (a) a first member;
   (b) a second member;
   (c) a lead screw carried by one of said members and adapted to effect relative translation between said members;
   (d) a scale secured to said one of said members in parallel relation to said lead screw, said scale having a series of spaced reference means thereon;
   (e) means movable with the other of said members and registering with said scale for indicating relative displacements between said members;
   (f) an axially fixed knob body corotatably secured to said lead screw for rotation thereof;
   (g) a plurality of axially fixed collars, one of which is mounted on said knob body and which supports part of said plurality of collars, each collar completely encircling said axially fixed knob body, and being individually rotatable with respect to said axially fixed knob body and with respect to each other by an unlimited amount;
   (h) a plurality of indicia on each of said collars and angularly spaced from each other to indicate relative displacements between said members when said knob body is rotated; and (i) a transparent finger supported on said one of said members in overlying relation to said plurality of collars and having thereon a reference line registering with said indicia on said collars.

5. In a positioning device adapted to displace a first member with respect to a second member, and having a lead screw member adapted on rotation thereof to effect movement of the first member with respect to the second member, the improvement of means adapted to angularly rotate the lead screw a predetermined amount, said means comprising:

(a) a knob body corotatably secured to the lead screw for rotation thereof;

(b) a rotatable collar fitted for rotation about said knob body, said rotatable collar having located thereon at least one series of angularly spaced indicia defining a calibrated scale related to the relative displacement between said members;

(c) a collar encircling and supported by said knob body, said knob body being rotatable within said collar;

(d) means carried by the second member and engaging said collar in a manner so as to preclude rotation thereof at all times, and extending radially therethrough and releasably locking said knob body against rotation; and (e) reference means secured to said non-rotatable collar and cooperating with said indicia for indicating relative displacement between the members.

References Cited in the file of this patent

UNITED STATES PATENTS

| | | |
|---|---|---|
| 909,538 | Buckminster | Jan. 12, 1909 |
| 1,191,016 | Slider et al. | Sept. 20, 1921 |
| 1,615,668 | Anderson | Jan. 25, 1927 |
| 2,618,860 | Engelhart | Nov. 25, 1952 |

FOREIGN PATENTS

| | | |
|---|---|---|
| 7,281 | Great Britain | Mar. 23, 1910 |